US009544066B2

(12) United States Patent
Fink et al.

(10) Patent No.: US 9,544,066 B2
(45) Date of Patent: Jan. 10, 2017

(54) FIBRE-OPTIC ENCLOSURE HAVING TRANSCEIVING MEANS OPERABLE TO GENERATE AND RECEIVE OPTICAL SIGNALS

(71) Applicant: 3M INNOVATIVE PROPERTIES COMPANY, St. Paul, MN (US)

(72) Inventors: Johannes Fink, Bergheim (DE); Christian Weinmann, Alsdorf (DE); Sebastian Eggert, Heidelberg (DE); Manfred Bauer, Wuppertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 62 days.

(21) Appl. No.: 14/442,282

(22) PCT Filed: Nov. 15, 2013

(86) PCT No.: PCT/US2013/070318
§ 371 (c)(1),
(2) Date: May 12, 2015

(87) PCT Pub. No.: WO2014/088784
PCT Pub. Date: Jun. 12, 2014

(65) Prior Publication Data
US 2016/0277123 A1    Sep. 22, 2016

(30) Foreign Application Priority Data

Dec. 4, 2012 (EP) ..................................... 12195432

(51) Int. Cl.
*H04B 10/00* (2013.01)
*H04B 10/80* (2013.01)
(Continued)

(52) U.S. Cl.
CPC .............. *H04B 10/808* (2013.01); *H04B 3/44* (2013.01); *H04B 10/25752* (2013.01)

(58) Field of Classification Search
CPC ............ H04L 27/2665; H04L 27/2657; H04W 64/006; H04N 21/41422; H04N 21/42607; H04N 5/455; H04N 5/4401
(Continued)

(56) References Cited

U.S. PATENT DOCUMENTS 5,369,518 A * 11/1994 Aslami ................. H04M 19/00
379/379
5,491,470 A    2/1996 Veligdan
(Continued)

FOREIGN PATENT DOCUMENTS

CN    102590576 A    7/2012
DE    4130903    3/1993
(Continued)

OTHER PUBLICATIONS

Search Report for CN Appl. No. 201380063165.7, dated Jun. 3, 2016, 2 pp.
(Continued)

*Primary Examiner* — Juan A Torres
(74) *Attorney, Agent, or Firm* — Gregg H. Rosenblatt

(57) ABSTRACT

Passive fibre-optic enclosure comprising, a) one or more fibre-optic functional units of a telecommunication network, optically connectable, via an optical fibre, with a central network unit, for receiving telecommunication signals for one or more subscribers via the optical fibre from the central network unit, characterized in that the enclosure further comprises, on the inside of the enclosure, b) transceiving means, which is operable to generate first optical signals using electrical energy, which is operable to receive optical response signals from the central network unit, which is optically connectable to the optical fibre such that the first optical signals can be transmitted by the optical fibre to the central network unit, and such that optical response signals (Continued)

can be transmitted by the optical fibre from the central network unit to the transceiving means.

14 Claims, 2 Drawing Sheets

(51) Int. Cl.
  *H04B 10/2575*   (2013.01)
  *H04B 3/44*   (2006.01)

(58) Field of Classification Search
  USPC .......................................................... 398/116
  See application file for complete search history.

(56) References Cited

U.S. PATENT DOCUMENTS

| | | | |
|---|---|---|---|
| 6,055,079 | A | 4/2000 | Hagans |
| 8,359,009 | B2 | 1/2013 | Schroeder |
| 8,705,929 | B2 * | 4/2014 | Kowalczyk .......... G02B 6/4441 385/135 |
| 2003/0011834 | A1 | 1/2003 | Delanghe |
| 2009/0096603 | A1 * | 4/2009 | Langsweirdt .......... G07C 11/00 340/539.1 |
| 2010/0046941 | A1 | 2/2010 | Stadler |
| 2012/0177373 | A1 | 7/2012 | Choi et al. |

FOREIGN PATENT DOCUMENTS

| | | |
|---|---|---|
| EP | 0288791 | 11/1988 |
| FR | 2764625 | 12/1998 |
| RU | 2423000 C1 | 6/2011 |
| WO | WO 94-15415 | 7/1994 |
| WO | WO 02/080401 | 10/2002 |
| WO | WO 2007-131006 | 11/2007 |

OTHER PUBLICATIONS

International Search report for PCT Application No. PCT/US2013/070318 mailed on Feb. 12, 2014, 3 pages.

"Small form-factor pluggable transceiver", Wikipedia, the Free Encyclopedia [online]; URL <https://en.wikipedia.org/w/index.php?title=Small_form-factor_pluggable_transceiver&oldid=663411963>, modified May 21, 2015 [Retrieved from the Internet Jul. 27, 2015], 6 pp.

Search Report for RU Appl. No. 2015119600, dated May 18, 2016, 2 pp.

* cited by examiner

FIBRE-OPTIC ENCLOSURE HAVING TRANSCEIVING MEANS OPERABLE TO GENERATE AND RECEIVE OPTICAL SIGNALS

BACKGROUND OF THE INVENTION

Field of the Invention

The invention relates to fibre-optic enclosures in general, and to a method of unlocking a door of such an enclosure.

Background

Fibre-optic networks are progressively used for transmitting data. Telecommunication companies use fibre-optic networks to transmit optical voice and data signals via optical fibres between a central network unit, e.g. a central office, and telecommunication customers, sometimes called subscribers. Larger fibre-optic networks comprise so-called splitters, which split optical signals in one incoming fibre into optical signals propagating in a plurality of outgoing fibres. In order to protect splitters against the environment, vandalism or other unauthorized access, splitters are often accommodated in fibre-optic enclosures. Such enclosures can be, for example, fibre-optic splice cabinets, splitter cabinets, street cabinets, or manholes, but also splice closures for only one or a few splitters. Such enclosures are normally locked to prevent unauthorized access, but when service or maintenance is to be performed on the splitters or the fibres optically connected to them, the enclosures must be unlocked in order to allow a person physical access to the interior of the enclosures. Physical access to the interior of an enclosure should only be allowed to authorized persons. Before a person, e.g. a service technician, can open the enclosure, he must be authenticated, so that only authorized persons can open the enclosure. For that purpose, many enclosures are equipped with a mechanical lock, and authorized service persons have a corresponding mechanical key that can unlock the lock and thereby allows opening the enclosure.

More sophisticated solutions are known, though. In the European Patent EP 2220625 B1, for example, an access point of a telecommunication network is described. The access point may be, e.g., a base station, an amplifier or a receiver station. Before opening the access point, a service technician communicates with a central network server using a notification device, e.g. a mobile phone. The central network server can authenticate the technician via a SIM card of his notification device. The international patent publication WO2007/131006 A2 describes a remote monitoring system comprising an electronic module inside a telecommunication enclosure. In certain embodiments, the electronic module can communicate with a remote communication device, e.g. a transponder or a handheld device, and receive authorization information from it. An electronic lock may use access information, sent by a transponder, to allow unlocking of the lock. Also, the access information may be sent to a central security system to check if accesses were authorized.

In traditional, copper-based telecommunication networks, electrical energy is available virtually everywhere, because it is needed to operate many components of the network. Enclosures in copper-based networks can therefore use the abundant electrical energy to perform authentication when a service technician requires access to the enclosure. In fibre-optic enclosures, however, electrical energy is normally not required to operate equipment inside an enclosure. Most equipment, like fibre-optic splitters, splices, connectors and fibres, for example, are passive elements, i.e. they do not require electrical energy to operate. For this reason, many fibre-optic enclosures are "passive" enclosures, i.e. they are not permanently provided with electrical energy by an external energy source. Passive enclosures are normally not equipped with an internal energy source, e.g. a battery, either, because maintenance and replacement of the battery requires service resources and is therefore costly. For these reasons, in passive fibre-optic enclosures no electrical energy is available for establishing a two-way communication for performing an authentication process, and they cannot store authentication information for a longer time. It is, however, desirable to authenticate a person before denying or allowing him access to the interior of a passive enclosure. The present disclosure seeks to address this problem.

SUMMARY

The present invention provides a passive fibre-optic enclosure comprising, on an inside of the enclosure, a) one or more fibre-optic functional units of a telecommunication network, optically connectable, via an optical fibre, with a central network unit, for receiving telecommunication signals for one or more subscribers via the optical fibre from the central network unit, characterized in that the enclosure further comprises, on the inside of the enclosure, b) transceiving means, operable to generate first optical signals using electrical energy, operable to receive optical response signals from the central network unit, optically connectable to the optical fibre such that the first optical signals can be transmitted by the optical fibre to the central network unit, and such that optical response signals can be transmitted by the optical fibre from the central network unit to the transceiving means, and adapted to receive the electrical energy for generating the first optical signals from the outside of the enclosure in a contactless manner.

The enclosure according to the present disclosure allows for sending information from the passive enclosure to a central network unit via optical fibres and for receiving information from the central network unit at the passive enclosure, even though the enclosure is normally not provided with electrical energy. The transceiving means can receive electrical energy from the outside of the enclosure for active communication with the central network unit. The electrical energy can thus be provided to the transceiving means only when necessary, e.g. when communication between the enclosure and the central network unit is necessary or desired. This may avoid the need to connect the passive enclosure permanently to a power network. The contactless energy transfer avoids the need to have physical contact elements on the outside of the enclosure. Such contact elements would be prone to damage by wear, vandalism or environmental effects.

Specifically, the passive enclosure according to the present disclosure may allow for authentication of a person seeking access by comprising transceiving means which can receive electrical energy from the outside of the enclosure in a contactless manner, and by using this energy to generate and receive optical signals for a two-way communication with a central network unit via an optical fibre. In that communication, authentication by a central network authority can be performed without having to access the interior of the enclosure.

The enclosure of the present disclosure may, for example, be a fibre-optic distribution enclosure, a fibre-optic splitter cabinet, a fibre-optic street cabinet or a fibre-optic distribution cabinet. Alternatively, the enclosure may be a manhole containing fibre-optic functional units, an underground fibre-optic closure. The enclosure may comprise fibre-optic functional units of a telecommunication network. Such functional units may, for example, be splitters, splitter modules, fibre-optic splices, fibre-optic splice trays, fibre-optic connectors, fibre-optic connector modules or fibre-optic connector storage devices. Such functional units may form part of a telecommunication network, which serves to transmit optical telecommunication signals to subscribers. Such functional units may receive optical telecommunication signals from the central network unit. These signals may be destined for certain telecommunication subscribers, i.e. these signals are signals for certain subscribers. The functional units may be operable to pass these telecommunication signals to one or more subscribers.

The transceiving means of an enclosure according to the present disclosure is operable to generate optical signals using electrical energy. The transceiving means may comprise a light-emitting diode or a laser for generating the first optical signals. The transceiving means may comprise a photo receiver for receiving the optical response signals. The transceiving means may, for example, use the electrical energy to power a light source, e.g. a laser, a laser diode, or a light-emitting diode, such that optical signals are generated. The optical signals generated by the transceiving means (the "first optical signals") may not be optical telecommunication signals for a subscriber. They may be destined for a central network unit. The first optical signals may be carried by light having a wavelength which is different from the wavelength(s) of light carrying telecommunication signals. The first optical signals may comprise identification information or authentication request information. Identification information may be information identifying a person or a device. Authentication request information may be information usable for authenticating a person or a device, it may be, for example, a secret key usable to confirm an identity of a person or a device, or it may be a public key of a public key infrastructure, or it may be information usable in a challenge-response process. A receipt of the authentication request information by the central network unit may cause the central network unit to process the authentication request information and to transmit optical response signals comprising authentication confirmation information to the transceiving means. The authentication confirmation information may be positive or negative.

The optical signals which the transceiving means can receive from the central network unit (the "optical response signals") may not be optical telecommunication signals for a subscriber. They may, for example, be destined for the transceiving means. The optical response signals may be carried by light having a wavelength which is different from the wavelength(s) of light carrying telecommunication signals. The optical response signals may comprise authentication confirmation information. Authentication confirmation information may comprise a positive confirmation of a previous authentication request, or a negative confirmation of a previous authentication request. Authentication confirmation information may be usable for authenticating a person or a device, it may be, for example, a secret key usable to confirm an identity of a person or a device, or it may be a public key of a public key infrastructure, or it may be information usable in a challenge-response process.

The transceiving means of an enclosure according to the present disclosure is optically connectable to an optical fibre which may optically connect a fibre-optic functional unit of the enclosure with the central network unit. The optical fibre may be operable to transmit optical signals between a fibre-optic functional unit and the central network unit in two directions. The optical fibre may be a fibre of the telecommunication network. The optical fibre may transmit telecommunication signals and the first optical signals simultaneously. It may transmit telecommunication signals and the optical response signals simultaneously. The optical fibre may comprise a plurality of fibre segments, optically connected with each other such as to extend the length of the optical fibre. The transceiving means of an enclosure according to the present disclosure may be optically connectable to the optical fibre by a further optical fibre and/or by an optical splitter.

The transceiving means is arranged inside the enclosure and it is adapted to receive the electrical energy for generating the first optical signals from the outside of the enclosure in a contactless manner. The transceiving means may, for example, be adapted by comprising a coil for inductively receiving the electrical energy. The coil may be arranged on the outside of another element of the transceiving means, it may be arranged adjacent to another element of the transceiving means or it may be arranged at a distance from another element of the transceiving means. The enclosure may comprise a housing, which defines an interior and an outside of the enclosure. The housing may have walls. The coil may be arranged close to a wall of the housing. This arrangement may make contactless energy transfer from the outside to the transceiving means more efficient. The walls may be made of an electrically insulating material. Contactless energy transfer through an insulating, i.e. non-conductive, wall may increase efficiency of the energy transfer.

The transceiving means may be adapted to receive electrical energy for generating the first optical signals from the outside of the enclosure in a contactless manner by comprising an antenna for receiving the electrical energy. The antenna may be operable to receive electrical energy for generating the first optical signals from the outside of the enclosure in a contactless manner, which energy is transmitted as an electromagnetic wave. The antenna may be arranged on the outside of another element of the transceiving means, it may be arranged adjacent to another element of the transceiving means or it may be arranged at a distance from another element of the transceiving means. In an alternative embodiment, the transceiving means may be adapted to receive electrical energy for generating the first optical signals from the outside of the enclosure in a contactless manner by comprising a capacitor plate for receiving the electrical energy. In this embodiment, electrical energy may be transmitted in a contactless manner to the transceiving means capacitively or electrostatically.

The transceiving means can receive electrical energy from the outside of the enclosure in a contactless manner. In certain embodiments, the electrical energy may enter the enclosure from the outside to the inside of the enclosure without being transmitted over a solid or liquid electrically conductive connection between the outside and the inside. The enclosure may thus have no galvanic contacts, for transferring electrical energy, that are accessible from the outside of the enclosure. In certain embodiments, the transceiving means may receive electrical energy inductively. The electrical energy for generating the first optical signals may be transmitted from the outside of the enclosure to the transceiving means as an electromagnetic wave. If the transceiving means comprises a coil, that coil may be used to receive the electromagnetic wave, whereby electrical energy is transferred to the coil and thereby to the transceiving means. Inductive transfer of electrical energy is an efficient and reliable way of contactless energy transfer. A coil is a versatile and cost-effective means to pick up an electromagnetic wave transferring electrical energy. Contactless transfer of electrical energy via an electromagnetic wave is further advantageous in that the electromagnetic wave may be modified such as to transfer information in parallel to the electrical energy. The electromagnetic wave may, for example, be modulated such that it comprises information. The transceiving means of an enclosure according to the present disclosure may thus generally be adapted to receive electrical energy in the form of an electromagnetic wave from the outside of the enclosure in a contactless manner. The transceiving means may be adapted to receive electrical energy in the form of an electromagnetic wave which contains information. The transceiving means may be adapted to receive electrical energy in the form of a modulated electromagnetic wave which contains information. The modulation may be suitable to provide a phase shift keying scheme, an amplitude shift keying scheme or a frequency shift keying scheme.

The electrical energy received by the transceiving means is suitable for generating the first optical signals. Generally, the transceiving means may be adapted to receive an amount of energy that is sufficient to generate optical signals of sufficient intensity to propagate through an optical fibre to the central network unit. This allows the transceiving means to send information, e.g. identification information or authentication request information, to the central network unit. The transceiving means may be further adapted to receive an amount of energy that is sufficient to generate optical signals of sufficient intensity to propagate through an optical fibre to the central network unit and sufficient to receive optical response signals from the central network unit. This enables the transceiving means to establish a two-way communication with the central network unit, which in turn allows to perform identification and/or authentication at the central network unit and to communicate the result back to the transceiving means of the enclosure.

The transceiving means may comprise a first receiver for receiving response signals from the central network unit, transmitted via the optical fibre. The first receiver may comprise, e.g., a photo detector. The transceiving means may further comprise a second receiver for receiving further information from the outside of the enclosure in a contactless manner. The further information may be comprised in electromagnetic waves. Such electromagnetic waves may conform to a communication standard like, for example, an RFID standard, a Bluetooth standard, a WLAN standard, or an NFC (near-field communication) standard. The electromagnetic waves may be modulated such as to comprise the further information. They may be modulated, for example, according to a frequency shift keying scheme, an amplitude shift keying scheme or a phase shift keying scheme. An electromagnetic wave comprising the further information may be a wave that also comprises electrical energy for generating the first optical signals. The second receiver of the transceiving means may comprise, for example, an antenna for receiving electromagnetic waves which conform to a communication standard like, for example, an RFID standard, a Bluetooth standard, a WLAN standard, or an NFC (near-field communication) standard, and/or the second receiver may comprise an antenna for receiving electromagnetic waves which are modulated, for example, according to a frequency shift keying scheme, an amplitude shift keying scheme or a phase shift keying scheme. The second receiver may be adapted to receive in a contactless manner, from the outside of the enclosure, both the electrical energy for generating the first optical signals and the further information, comprised in electromagnetic waves. In certain embodiments, the second receiver is adapted to receive a single electromagnetic wave which comprises both electrical energy for generating the first optical signals and the further information. In these embodiments, the second receiver may comprise a coil or an antenna.

In certain embodiments of the present disclosure, the passive fibre-optic enclosure comprises a door, which is lockable and unlockable. The door may be operable to provide access to an interior of the enclosure from the outside. When the door is unlocked, it may be opened such as to provide access to the interior of the enclosure from the outside. The enclosure may further comprise a locking device which is operable to unlock the door using electrical energy. The transceiving means may be operable to communicate with the locking device such as to cause the locking device to unlock the door. In these embodiments, the interior of the enclosure is protected, but the transceiving means can grant access to the interior of the enclosure by causing unlocking of the door. Since the transceiving means can communicate with the central network unit when provided with electrical energy, the transceiving means can obtain information from the central network unit which allows the transceiving means to decide if the door should be unlocked or not. Access to the interior of the enclosure can thus be granted or denied in dependence from information received from the central network unit. This may help to establish centralized access control for the enclosure, which increases the overall security of the enclosure and thereby of the telecommunications network, components of which are housed in the enclosure. The transceiving means may be adapted to receive electrical energy for unlocking the door from the outside of the enclosure. It may be adapted to receive this energy in a contactless manner. The transceiving means may be adapted to transmit electrical energy, suitable to unlock the door, to the locking device. The electrical energy may be suitable for unlocking the door. The locking device can thus use the electrical energy to unlock the door. The transceiving means may be operable to communicate with the locking device, for example, via an electrical connection or in a wireless manner. The transceiving means may be operable to cause the locking device to unlock the door, based on information, e.g. authentication confirmation information, comprised in the optical response signals received from the central network unit.

The present disclosure also provides a powering device which comprises electrical energy storage means, and which is operable to transmit electrical energy from the energy storage means, in a contactless manner, to the transceiving means of the passive fibre-optic enclosure as described above, which electrical energy can be used by the transceiving means to generate the first optical signals. The powering device can thus be used to provide the transceiving means of a passive fibre-optic enclosure according to this disclosure with electrical energy, when the transceiving means requires electrical energy for generating the first optical signals, for receiving the optical response signals, for communicating with the locking device in order to cause unlocking a door, and/or for other purposes. The powering device may be arranged outside the enclosure. The powering device may be a means to transfer electrical energy to the transceiving means in order to generate optical signals for communication between the passive enclosure and the central network unit.

The electrical energy storage means may comprise a battery. The powering device may comprise a coil for inductively transmitting electrical energy to the transceiving means. Inductive transmission of electrical energy avoids the use of contacts on the outside of the enclosure, as explained above. The electrical energy for generating the first optical signals may be transmitted by the powering device to the transceiving means as an electromagnetic wave. The electromagnetic wave transmitted by the powering device to the transceiving means may comprise further information. It may, for example, comprise identification information or authentication request information or other information. The electromagnetic wave may be modulated such as to comprise the further information. It may be modulated, for example, according to a frequency shift keying scheme, an amplitude shift keying scheme or a phase shift keying scheme. The electromagnetic wave comprising the further information may conform to a communication standard like, for example, an RFID standard, a Bluetooth standard, an NFC standard or a WLAN standard. An electromagnetic wave comprising the further information may be a wave that also comprises electrical energy for generating the first optical signals. It may be advantageous to transmit energy and information in the same electromagnetic wave, because only one emitter or one antenna is needed to transmit both energy and information, and only one receiver is required.

The powering device may be operable to transmit identification information, authentication request information, or other information to the transceiving means. The transceiving means may use the identification information or the authentication request information to identify and/or to authenticate the powering device. The transceiving means may, for the purpose of identification or authentication, send the identification information or the authentication request information to the central network unit via the optical fibre, and receive authentication confirmation information back from the central network unit, as explained above. The transceiving means may thereby obtain information if the powering device has been identified and/or authenticated or not.

The powering device may be operable to transmit electrical energy from the energy storage means, in a contactless manner, to the transceiving means of the passive fibre-optic enclosure as described above, which electrical energy can be used for receiving optical response signals from the central network unit. In embodiments, in which the transceiving means requires electrical energy to receive the response signals, the powering device can provide this energy, and in the same way as it can provide energy to the transceiving means for generating the first optical signals. The powering device may further be operable to transmit electrical energy from the energy storage means, in a contactless manner, to the transceiving means of the passive fibre-optic enclosure as described above, which electrical energy can be used for processing the optical response signals received from the central network unit.

The powering device may comprise data entry means to receive identification information and/or authentication request information from a person operating the powering device. This may allow to identify and/or to authenticate the person operating the powering device, by way of the transceiving means communicating with the central network unit. The transceiving means may send the information received from the person operating the powering device to the central network unit via the optical fibre, and receive information back from the central network unit, as explained above. The transceiving means may thus obtain information if the person operating the powering device has been identified and/or authenticated or not.

In certain embodiments, the powering device is further operable to transmit electrical energy from the energy storage means, in a contactless manner, to the transceiving means of the passive fibre-optic enclosure as described above, which electrical energy can be used for unlocking the door. This may be advantageous in that the powering device can provide all the electrical energy required for generating the first optical signals and for unlocking the door in the same manner. The enclosure may thus remain an entirely passive enclosure, which is provided with electrical energy by an external source not permanently, but only when required, e.g. when required to unlock the door. This is advantageous in that no extra power supply for unlocking the door is required. One powering device may thus provide all the electrical energy required for identification, authentication and unlocking.

In certain embodiments, the powering device is a handheld device. It may thus be easily carried by a person to a passive fibre-optic enclosure. It may also be easily associated with a specific person, because it may be carried by that person any time.

The present disclosure also provides a method of unlocking a door of a passive fibre-optic enclosure, comprising, in this sequence, the steps of a) providing an enclosure as described above, and a powering device as described above, b) operating the powering device to transmit electrical energy and identification information or authentication request information from the powering device to the transceiving means in a contactless manner, c) operating the transceiving means to receive the electrical energy and to generate first optical signals comprising the identification information or authentication request information, d) operating the transceiving means to transmit the first optical signals through the optical fibre to a central network unit and to receive optical response signals from the central network unit, e) operating the transceiving means to communicate with the locking device such as to cause the locking device to unlock the door, based on information comprised in the optical response signals received from the central network unit.

This method provides that a passive fibre-optic enclosure, which is not permanently provided with electrical energy by an external source, can communicate over optical fibres with a central network unit and unlock a door when requested. The enclosure can thus remain normally unpowered and needs not be permanently connected to a power network. The method thereby provides identification and authentication for centralized control of access to a passive fibre-optic enclosure. This increases the security of the enclosure and thereby of the entire telecommunications network.

BRIEF DESCRIPTION OF THE DRAWINGS

The invention will now be described in more detail with reference to the following Figures exemplifying particular embodiments of the invention.

DETAILED DESCRIPTION

Figure 1:
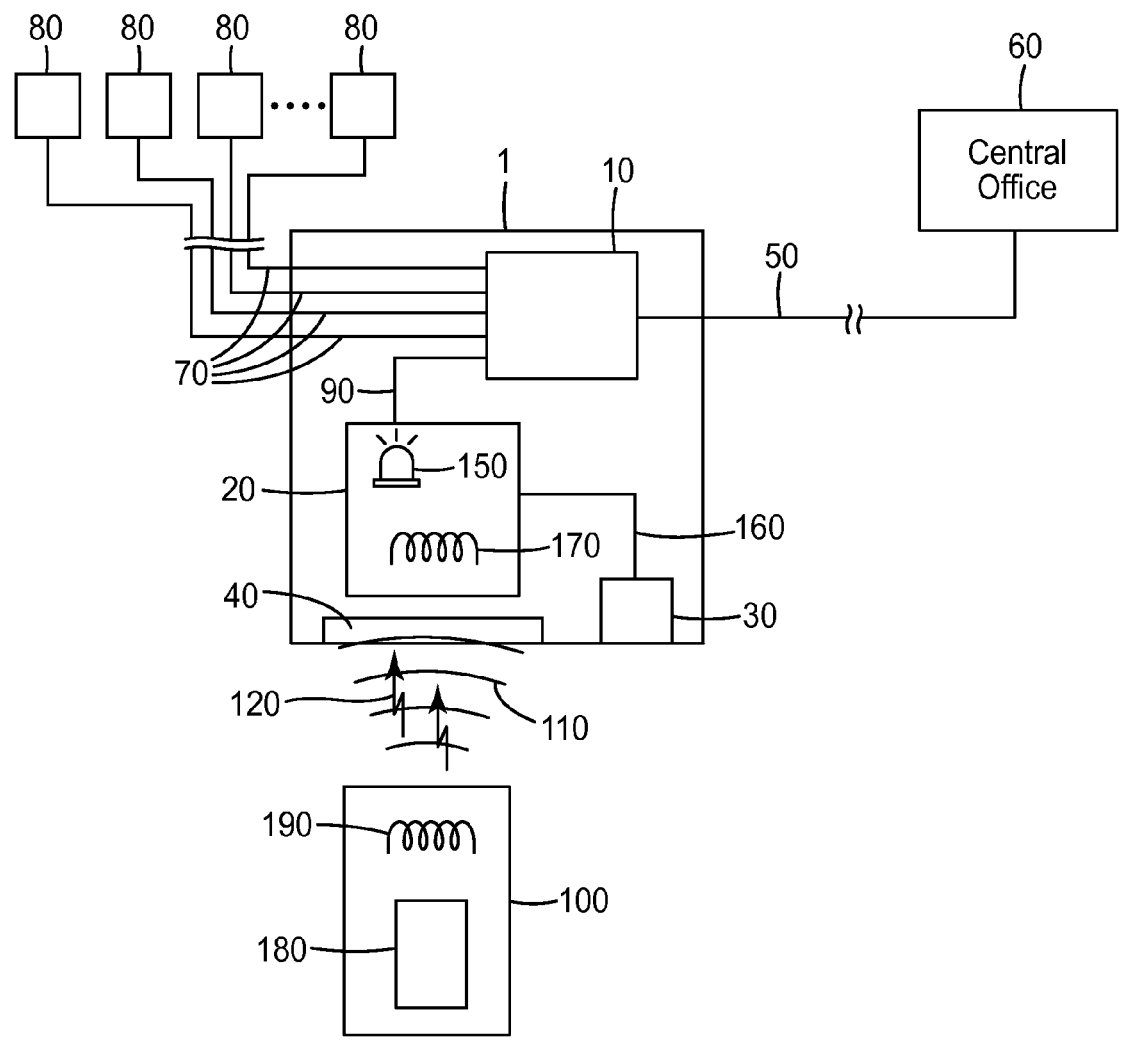
FIG. 1 Functional diagram of an enclosure and a powering device according to the present disclosure, and FIG. 2 Functional diagram of an alternative enclosure and an alternative powering device according to the disclosure.

Herein below exemplary embodiments of the present disclosure are described and shown in the drawings wherein like elements are provided with the same reference numbers.

FIG. 1 is a functional diagram. It shows a passive fibre-optic enclosure 1 and a powering device 100 according to the present disclosure. The enclosure 1 comprises a fibre-optic splitter 10, a transceiver 20 and a lock 30. The lock 30 can lock and unlock a door 40 of the enclosure 1. An optical fibre 50, called a feed fibre 50 in this context, optically connects the splitter 10 to a central network unit 60, which in this embodiment is a central office of a telecommunications network. The central network unit 60 transmits optical telecommunication signals via the feed fibre 50 to the splitter 10, which splits the signals and transmits them via subscriber fibres 70 to a number of subscribers 80. In an opposite direction, optical telecommunication signals from the subscribers 80 can be transmitted via the subscriber fibres 70 to the splitter 10 and from the splitter 10, via the feed fibre 50, to the central network unit 60 of the telecommunications network. The transceiver 20 can receive electrical energy 110 and identification data 120 from a handheld powering device 100, arranged outside the enclosure 1, in a wireless manner. With the electrical energy 110 and the identification data 120 received, the transceiver 20 can then generate optical signals comprising some or all of the identification data 120 and transmit the optical signals to the central network device 60. The central network device 60 checks the identification data 120 and transmits authentication confirmation data back to the transceiver 20. Based on information comprised in these authentication confirmation data, the transceiver 20 can cause the lock 30 to unlock the door 40.

The enclosure 1 is a passive enclosure 1, i.e. it is not permanently provided with electrical energy by an external energy source. The enclosure 1 and functional units which it comprises can perform their normal telecommunication network operation without being provided with electrical energy. The splitter 10 is a passive fibre-optic functional unit, i.e. it does not require electrical energy to perform its task. Hence, for passing telecommunications data between the central network unit 60 and subscribers 80, no electrical energy is needed. Normally, the enclosure 1 does not contain active components like, e.g. light sources, lasers, diodes, repeaters, or amplifiers, and is therefore not permanently provided with electrical energy.

The splitter 10 is a fibre-optic functional unit of the telecommunication network. The telecommunication network comprises the central network unit 60, the feed fibre 50, the splitter 10, the subscriber fibres 70 and Optical Network Units (ONUs) at the locations of the subscribers 80. The enclosure 1 is located a few kilometers away from the central network unit 60, and it comprises on its inside the splitter 10, which serves to distribute telecommunication signals to subscribers 80. The enclosure 1 is therefore also sometimes called a distribution enclosure, a splitter cabinet, a street cabinet or a distribution cabinet. The enclosure 1 can house one or more other fibre-optic functional units of the telecommunication network, like e.g. splitter modules, splices, splice trays, fibre-optic connectors, connector modules or connector storage devices instead of or in addition to the splitter 10. Being part of the telecommunication network, such functional units are optically connectable or connected, via the feed fibre 50, with the central network unit 60. They can thus receive telecommunication signals for one or more subscribers 80 via the feed fibre 50 from the central network unit 60.

The transceiver 20 is optically connected, via a transceiver fibre 90, to the splitter 10. The splitter 10, in turn, is optically connected via the feed fibre 50 to the central network unit 60. The transceiver 20 is thus optically connected to the feed fibre 50. The transceiver 20 comprises a combined emission/detection device 150. The emission/detection device 150 comprises a light source that can generate optical signals using electrical energy. The emission/detection device 150 of the transceiver 20 is optically connected to the transceiver fibre 90 such that is optically connected to the feed fibre 50. Optical signals, generated by the emission/detection device 150, can thereby be transmitted to the central network unit 60. In the other direction, optical signals can be transmitted from the central network unit 60 through the feed fibre 50, the splitter 10, and the transceiver fibre 90 to the emission/detection device 150 in the transceiver 20. The emission/detection device 150 comprises a detector that can detect optical signals entering the transceiver 20 through the transceiver fibre 90.

There is thus a two-way communication link between the transceiver 20 and the central network unit 60. This link allows to, for example, send optical signals containing identification or authentication data from the transceiver 20 to the central network unit 60, which can process these data. Processing these identification or authentication data can involve checking their authenticity or validity. In response to receiving the identification or authentication data, the central network unit 60 can send back other optical signals, also called "optical response signals" or "response signals" here, to the transceiver 20. These response signals can for example, contain the result of an identification process or of an authentication process which the central network unit performed on the identification or authentication data. The response signals can, for example, contain the positive or negative confirmation of an authorization process.

The enclosure 1 shown in FIG. 1 comprises the door 40, which can be opened and closed. In its closed position, the door 40 can be locked and unlocked by the lock 30. The lock 30 is an electromechanical lock, which is controlled by the transceiver 20. The transceiver 20 can communicate with the lock 30 via a communication line 160, which is a copper wire in the embodiment shown in FIG. 1. The transceiver 20 can send an electrical unlock signal to the lock 30 that causes the lock 30 to mechanically unlock the door 40, so that the door 40 can be opened and grants access to the interior of the enclosure 1. The unlock signal is a strong electrical pulse that makes an electrical magnet in the lock 30 to retract a locking bar (not shown). If the transceiver 20 receives, for example, a positive authentication confirmation from the central network unit 60 in response to identification information sent to the central network unit 60, it sends the unlock signal to the lock 30, causing the lock 30 to unlock the door 40. If the transceiver 20 does not receive a positive authentication confirmation from the central network unit 60 in response to the identification information sent to the central network unit 60, it does not send the unlock signal to the lock 30, and the door 40 remains locked and cannot be opened.

The enclosure 1 is a passive enclosure, not permanently provided with electrical energy by an external electricity supply. Normally, there is thus no electrical power available in the enclosure 1 to generate optical signals in the enclosure 1. When required, however, electrical power can be made available to the transceiver 20 in the enclosure 1 from outside the enclosure 1. In the embodiment shown in FIG. 1, electrical energy can be transmitted to the transceiver 20 in a contactless manner. Contactless energy transfer is preferred for this enclosure 1, because it does not require any external contacts or adaptors on the enclosure 1 for transferring energy. Such external contacts or adaptors are not desirable, because they tend to attract vandalism and may be impacted by environmental conditions. Specifically, the transceiver 20 is equipped with an inductive receiving coil 170. The receiving coil 170 is arranged close to the door 40, so that electrical energy can be transferred inductively from the outside through the door 40 at a short distance, i.e. with little electrical losses and higher efficiency. The energy transferred by the receiving coil 170 to the transceiver 20 is used by the transceiver 20 to operate the emission/detection device 150, which generates the optical signals that are transmitted to the central network unit 60. The energy is also used by the emission/detection device 150 to detect the response signals which the central network unit 60 sent to the transceiver 20. The energy is further used to cause the lock 30 to unlock the door 40, if the transceiver 20 has received a positive authentication confirmation from the central network unit 60.

The source of the electrical energy transferred to the transceiver 20 is a handheld powering device 100. The powering device 100 comprises a battery 180 and an emitting coil 190, electrically connected to the battery 180. The battery 180 can store electrical energy, which can power the emitting coil 190, so that the emitting coil 190 can generate an electromagnetic wave which carries electrical energy 110. The receiving coil 170 in the transceiver 20 can pick up that electromagnetic wave and thereby receive the electrical energy 110 contained in the electromagnetic wave. The battery 180 of the powering device 100 is a battery as used in a mobile telephone. It provides an operation voltage of 5 Volt and has a capacity of about 1000 mAh. The powering device 100 generates an electrical output of about 5 Watt while transferring electrical energy 110 to the transceiver 20.

Figure 2:
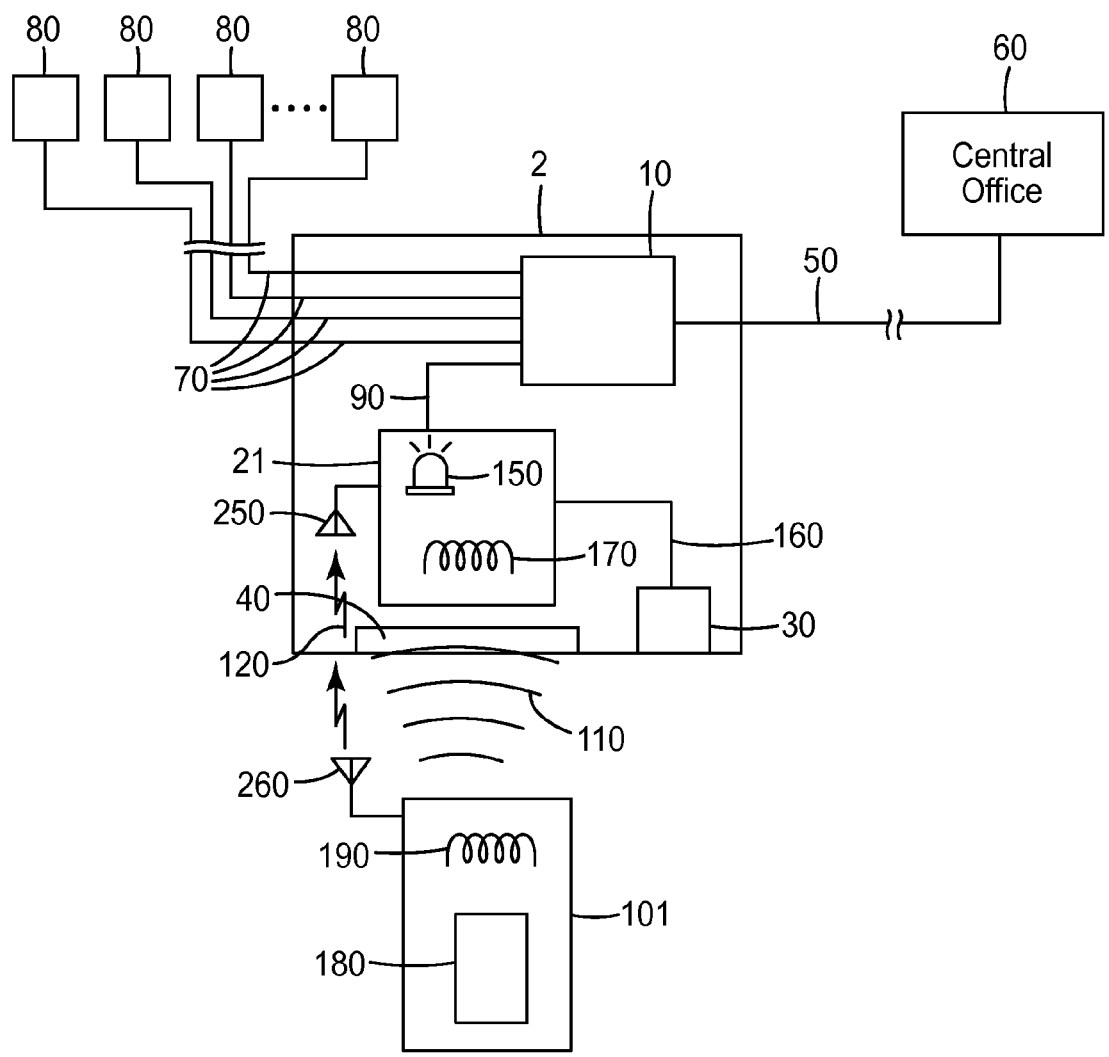

In the embodiment shown in FIG. 1, the powering device 100 transmits a device-specific identification code (ID code) 120 with the electrical energy 110 to the transceiver 20. The ID code 120 is a form of identification data 120. It is stored in a protected internal memory (not shown) of the powering device 100. The ID code 120 is transmitted with the electrical energy 110 in the electromagnetic wave by modulating the electromagnetic wave using a method called amplitude shift keying. Alternative methods, e.g. frequency shift keying or phase shift keying, may be used. In certain embodiments of the disclosure, e.g. as shown in FIG. 2, identification data 120 can be transmitted from the powering device 100 to the transceiver 20 over a separate channel, e.g. using a dedicated antenna on the powering device 100 for emission of identification data 120, and a further dedicated antenna on the transceiver 20 for receiving the identification data 120. In certain embodiments, the transceiver 20 may be operable to transmit information to the powering device 100, and the powering device 100 may be operable to receive information from the transceiver 20.

The amount of electrical energy 110 received by the transceiver 20 is sufficient to generate the optical signals that the transceiver 20 then transmits to the central network unit 60 via the transceiver fibre 90 and the feed fibre 50. These optical signals comprise the ID code 120. The central network unit 60 receives the ID code 120, checks it authenticity, and transmits positive or negative authentication confirmation data back to the transceiver 20. These authentication confirmation data are comprised in optical response signals, which the central network unit 60 transmits, via the feed fibre 50 and the transceiver fibre 90, to the transceiver 20. In certain embodiments of the disclosure, the authentication process involves multiple communications between the transceiver 20 and the central network unit 60 via the transceiver fibre 90 and the feed fibre 50. In certain embodiments, the authentication process comprises a challenge-response process between the transceiver 20 and the central network unit 60.

The central network unit 60 is located in a central office of a network operator, and has therefore abundant electrical energy at its disposal. The transceiver 20, however, is provided with electrical energy by the powering device 100, at least for the duration of the authentication process. This process takes a few seconds only, so that the capacity of the battery 180 is sufficient to provide electrical energy for generating optical signals for running a large number of such authentication processes.

If the authentication by the central network unit 60 is successful, the central network unit 60 sends positive authentication confirmation data back to the transceiver 20. Based on the positive authentication confirmation data, the transceiver 20 sends an unlock signal, a strong electrical pulse, to the lock 30 over the communication line 160, which causes the lock 30 to unlock the door 40. A person can then open the door 40 and access the interior of the enclosure 1. In case of the authentication by the central network unit 60 being unsuccessful, the central network unit 60 sends negative authentication confirmation data back to the transceiver 20. In that case, the transceiver does not send an unlock signal to the lock 30. The lock 30 keeps locking the door 40, the door 40 cannot be opened, and the interior of the enclosure 1 cannot be accessed.

In an alternative embodiment of this disclosure, the ID code 120 is not stored in the memory of the powering device 100. Instead, the powering device 100 comprises a keyboard. The person using the powering device can enter, when prompted, a specific code, e.g. his employee number or a secret key, into the powering device 100 using the keyboard. The powering device 100 transmits this code to the transceiver 20. While receiving electrical energy from the powering device 100, the transceiver 20 generates optical signals which comprise the ID code. These optical signals thus comprise the identification information entered by the person. The transceiver 20 transmits these optical signals to the central network unit 60, thereby requesting authentication of the person. As described above, the central network unit 60 runs an authentication process and sends authentication confirmation data back to the transceiver 20, which causes the lock 30 to unlock the door 40, if the authentication confirmation data was positive. It is to be noted that in this embodiment, any kind of data entered into the keyboard of the powering device 100 can be transmitted to the central network unit 60.

In a further, alternative embodiment, not shown in FIG. 1, the information sent to the central network unit 60 is stored in an internal permanent memory of the transceiver 20. In this embodiment, the powering device 100 transfers electrical energy 110 to the transceiver 20, which uses this energy to read the information from its internal permanent memory. The transceiver 20 generates optical signals comprising this information and transmits those signals to the central network unit 60 via the transceiver fibre 90, the splitter 10, and the feed fibre 50.

In a yet further alternative embodiment, not shown in FIG. 1, the transceiver 20 receives electrical energy 110 from the powering device and uses a part of the energy to operate a sensor in the enclosure 1, e.g. a temperature sensor or a humidity sensor. The transceiver 20 receives information from the sensor and uses another part of the electrical energy 110 received from the powering device 100 to generate optical signals which comprise information from the sensor. The transceiver 20 transmits these optical signals to the central network unit 60. In this embodiment, the electrical energy is used to transmit sensor information from a passive enclosure 1 to the central network unit 60.

FIG. 2 is a functional diagram of a further passive fibre-optic enclosure 2 and a powering device 101 according to the present disclosure. The enclosure 2 is identical to the enclosure 1 shown in FIG. 1, except for the transceiver 21 comprising a first antenna 250. The powering device 101 is identical to the powering device 100 shown in FIG. 1, except for the powering device 101 comprising a second antenna 260. In the embodiment shown in FIG. 2, the powering device 101 transmits a device-specific identification code (ID code) 120 via the second antenna 260, separately from the electrical energy 110, i.e. over a separate channel. The transceiver 21 receives the ID code 120, or in general, identification data 120, via the first antenna 250. The first antenna 250 on the transceiver 20 thus forms a second receiver, which, in general, can receive further information from the outside of the enclosure 2 in a contactless manner. The first antenna 250 is powered by electrical energy received from the powering device 101. The further information is, in this embodiment, comprised in electromagnetic waves, which are separate from the electromagnetic waves comprising the electrical energy for generating the first optical signals. In certain embodiments, the transceiver 21 may be operable to transmit information to the powering device 101, and the powering device 101 may be operable to receive information from the transceiver 21.

The invention claimed is:

1. Passive fibre-optic enclosure comprising, on an inside of the enclosure,
   a) one or more fibre-optic functional units of a telecommunication network, optically connectable, via an optical fibre, with a central network unit, for receiving telecommunication signals for one or more subscribers via the optical fibre from the central network unit,
   characterized in that the enclosure further comprises, on the inside of the enclosure,
   b) transceiving means,
      operable to generate first optical signals using electrical energy,
      operable to receive optical response signals from the central network unit,
      optically connectable to the optical fibre such that the first optical signals can be transmitted by the optical fibre to the central network unit, and such that optical response signals can be transmitted by the optical fibre from the central network unit to the transceiving means, and
      adapted to receive the electrical energy for generating the first optical signals from the outside of the enclosure in a contactless manner.

2. Enclosure according to claim 1, wherein the electrical energy for generating the first optical signals is transmitted from the outside of the enclosure to the transceiving means as an electromagnetic wave, and wherein the electromagnetic wave comprises further information.

3. Enclosure according to claim 1, wherein the transceiving means comprises a coil for inductively receiving electrical energy from the outside of the enclosure.

4. Enclosure according to claim 1, wherein the transceiving means comprises a first receiver for receiving response signals from the central network unit, and a second receiver for receiving further information from the outside of the enclosure in a contactless manner.

5. Enclosure according to claim 1, wherein the first optical signals comprise identification information or authentication information, and wherein the optical response signals comprise authentication confirmation information.

6. Enclosure according to claim 1, wherein the transceiving means comprises a light-emitting diode or a laser for generating the first optical signals, and wherein the transceiving means comprises a photo receiver for receiving the optical response signals.

7. Enclosure according to claim 1, wherein the fibre-optic functional unit(s) comprise(s) a fibre-optic splitter, a fibre-optic splitter module, a fibre-optic splice, a fibre-optic splice tray, a fibre-optic connector, a fibre-optic connector module, or a fibre-optic connector storage device.

8. Enclosure according to claim 1, wherein the enclosure further comprises a lockable and unlockable door, operable to provide access to an interior of the enclosure from the outside, and a locking device, operable to unlock the door using electrical energy,
   wherein the transceiving means is operable to communicate with the locking device such as to cause the locking device to unlock the door.

9. Powering device, comprising electrical energy storage means, the powering device being operable to transmit electrical energy from the energy storage means, in a contactless manner, to the transceiving means of an enclosure according to claim 1, which electrical energy can be used by the transceiving means to generate the first optical signals.

10. Powering device according to claim 9, operable to transmit identification information, authentication request information, or other information to the transceiving means.

11. Powering device according to claim 9, wherein the electrical energy for generating the first optical signals is transmitted as an electromagnetic wave, and wherein the electromagnetic wave comprises identification information or authentication request information or other information.

12. Enclosure according to claim 8, wherein the transceiving means is adapted to receive electrical energy for unlocking the door from the outside of the enclosure in a contactless manner, and to transmit the electrical energy for unlocking the door to the locking device.

13. Enclosure according to claim 8, wherein the transceiving means is operable to cause the locking device to unlock the door, based on information comprised in the optical response signals received from the central network unit.

14. Method of unlocking a door of a passive fibre-optic enclosure, comprising, in this sequence, the steps of
   a) providing an enclosure according to claim 8, and a powering device,
   b) operating the powering device to transmit electrical energy and identification information or authentication request information from the powering device, to the transceiving means in a contactless manner,
   c) operating the transceiving means to receive the electrical energy, to generate first optical signals comprising the identification information or authentication request information, and to transmit the first optical signals through the optical fibre to a central network unit,
   d) operating the transceiving means to receive optical response signals from the central network unit,
   e) operating the transceiving means to communicate with the locking device such as to cause the locking device to unlock the door, based on information comprised in the optical response signals received from the central network unit.

* * * * *